United States Patent [19]

Mélard et al.

[11] Patent Number: 4,601,755

[45] Date of Patent: Jul. 22, 1986

[54] CERIUM BASED GLASS POLISHING COMPOSITIONS

[75] Inventors: Pierre Mélard, Lagord; Marcel Peltier, La Rochelle; Francis Tastu, Nieul/sur/Mer, all of France

[73] Assignee: Rhone-Poulenc Specialites Chimiques, Courbevoie, France

[21] Appl. No.: 635,828

[22] Filed: Jul. 30, 1984

[30] Foreign Application Priority Data

Jul. 29, 1983 [FR] France .................................. 83 12519

[51] Int. Cl.⁴ ................................................ C09G 1/02
[52] U.S. Cl. ............................................ 106/3; 51/308; 51/309; 156/DIG. 63; 423/263
[58] Field of Search ............... 106/3, 288 B, 287.34; 51/309, 308; 423/263; 156/DIG. 63; 502/263, 302, 304, 303

[56] References Cited

U.S. PATENT DOCUMENTS

| | | | |
|---|---|---|---|
| 3,262,766 | 7/1966 | Nonamaker | 51/309 |
| 3,768,989 | 10/1973 | Goetzinger et al. | 51/309 |
| 4,161,463 | 7/1979 | Myers et al. | 502/263 |
| 4,162,921 | 7/1979 | Litvinov et al. | 501/9 |

*Primary Examiner*—Amelia B. Yarbrough
*Attorney, Agent, or Firm*—Burns, Doane, Swecker & Mathis

[57] ABSTRACT

Cerium based glass polishing compositions, well adapted for the polishing, e.g., of optical glass, are comprised of (i) at least one crystalline phase of $CeO_2$ type, and (ii) a crystalline phase which comprises a rare earth pyrosilicate having the formula $Ln_{2-x}Ce_xSi_2O_7$, wherein Ln is at least one lanthanide or yttrium and x is a number ranging from zero to less than 2.

59 Claims, No Drawings

CERIUM BASED GLASS POLISHING COMPOSITIONS

BACKGROUND OF THE INVENTION

1. Field of the Invention:

The present invention relates to novel cerium based polishing compositions, a process for the preparation thereof, and to the use of same in the polishing of glass, ceramics and other vitreous type materials.

2. Description of the Prior Art:

Among the polishing compositions currently in use in the glass industry, those based on the rare earths, and in particular cerium, are generally the most effective and efficient. Different processes too are known for the production of such compositions. Thus, it has been proposed, in German Pat. No. 2,426,110, to precipitate an aqueous solution of a rare earth sulfate with sodium hydroxide in the presence of molochite, and to then filter, wash, dry and calcine the precipitate to obtain the desired polishing composition. Such a process does not permit the obtainment of polishing compositions having completely satisfactory efficacy, particularly in view of their heterogeneity, undefined structure and lack of reproducibility of the final products. These disadvantages originate specifically from the operating conditions of the process, wherein the concentration of the reagents changes over the course of the reaction and it is thus impossible to obtain defined products in a reproducible fashion; they are also occasioned by the existence of foreign compounds (molochite) and the presence of sulfates, the precipitation of which by sodium hydroxide yields mixtures of complex molecules, such as double sulfates, hydroxysulfates and hydroxides, the amount and nature of which may vary over the course of the reaction.

It has also been proposed, *Chemical Abstracts*, 80, 51688 (1974), to produce cerium based polishing compositions by precipitating ceric hydroxide with ammonia from a solution of a rare earth nitrate, wherein the cerium has been previously oxidized. Such a process mandates a supplementary purification step by recrystallization with the ceri-ammoniacal nitrate and taking up the calcined oxide in a dilute acid. The final products, moreover, do not have a satisfactory polishing efficacy. Furthermore, such final compositions also do not have satisfactory homogeneity or structural characteristics, and they are not reproducible.

In U.S. Pat. No. 3,768,989 a process is described for the preparation of polishing compositions by the formation of a precipitate of a rare earth carbonate-wollastonite, separation of the precipitate and the calcination thereof. And in U.S. Pat. No. 3,262,766 a process is described for preparing polishing compositions by treating solutions of commercially available rare earth carbonates with either fluosilicic or hydrofluosilicic acid. Polishing compositions prepared by the processes described in either of these two U.S. patents, however, have disadvantages akin to those described above for the compositions prepared according to the teachings of the '110 German patent.

To eliminate the disadvantages of the aforementioned processes, a novel process has been proposed in French Pat. No. 2,472,601, assigned to the assignee hereof, in accordance with which:

(a) a solution of a cerium salt is continuously mixed with a basic solution and a solution of at least one acid and/or salt, the anion or anions of which are capable of forming insoluble rare earth compounds, with the number of equivalents of base being greater than or equal to the number of equivalents of cerium and the pH of the reaction medium being higher than 6;

(b) the resultant precipitate is filtered;

(c) dried; and (d) thence calcined.

This process provides polishing compositions having good homogeneity and reproducibility, good stability upon suspension in water and good polishing efficacy. However, the immediately aforedescribed process is not entirely satisfactory, since the anion typically employed is fluoride which gives rise to those problems necessarily associated with the use of fluorides, in particular pollution which may be caused by the effluent therefrom, whether in liquid or gaseous state.

SUMMARY OF THE INVENTION

Accordingly, a major object of the present invention is the provision of improved cerium based polishing compositions which exhibit the following desirable characteristics:

(i) effectiveness, i.e., they enable the polishing of a generally ground glass surface as rapidly as possible;

(ii) acceptability, i.e., they will not scratch the glass during the polishing operation;

(iii) inertness, i.e., they will not cause a detrimental reaction on the surfare of the glass, e.g., they do not display excessive chemical activity with respect to the glass, thereby avoiding the problems of burning, orange peel, blisters, and the like;

(iv) a very long useful life or longevity, i.e., they are suitable for use for the longest possible period of time without deterioration or difficulties;

(v) good stability in suspension, i.e., permitting a homogeneous distribution of particulates or powder thereof in appropriate bath and avoiding any deposits thereof.

The dispersion, as aforesaid, is effective as soon as the composition is placed in suspension and remains so during the entire operation.

Such dispersions, moreover, do not foam; foaming causes overflowing, clogs the lines, reduces yields and inconveniences the operating personnel. Furthermore, the subject compositions are readily re-suspended after an extended stoppage and settling period, even if the bath is charged with particles of polished glass (the phenomenon of "caking").

Also, the compositions of the invention are not toxic, thus preventing any problems of skin disorders or other diseases. They are, moreover, uniform, possess a pleasing color and are easy to work with. They do not adhere to the glass after polishing, thereby permitting rapid cleaning, and are easy to flocculate, to eliminate manufacturing rejects.

Briefly, the novel cerium based glass polishing compositions of the present invention comprise at least one crystallographic phase of the $CeO_2$ type and a crystallographic phase comprising a rare earth pyrosilicate having the formula $Ln_{2-x}Ce_xSi_2O_7$, wherein Ln represents at least one element selected from among the lanthanides and yttrium and wherein x is greater than or equal to 0 and less than 2.

In addition to the aforesaid two essential crystallographic phases, the compositions of the invention may optionally comprise in certain cases other crystallized phases of rare earth oxides or phases of silicon oxide, more or less crystallized.

DETAILED DESCRIPTION OF THE INVENTION

More particularly according to the present invention, it has now surprisingly been found that unexpectedly desirable glass polishing properties are imparted to the subject compositions by inclusion therein of the $Ln_{2-x}Ce_xSi_2O_7$ phase.

By the term "glass" as utilized herein, there are intended not only glass and ceramics, but also the other materials of vitreous type.

The present invention also features a novel process for the preparation of the subject compositions, said process comprising:

(i) simultaneously mixing a solution of a cerium salt, a basic solution, an aqueous solution of a salt of at least one trivalent rare earth or of yttrium, and a solution of at least one oxide derivative of silicon capable of forming insoluble rare earth compounds;

(ii) filtering the precipitate which results; and (iii) drying and calcining said filtered precipitate at a temperature higher than 850° C.

The appearance of the crystallographic phase $Ln_{2-x}Ce_xSi_2O_7$ has been detected under specific conditions of calcination at temperatures higher than 850° C.

In the first stage of the process, the intimate admixture of the different reagents is carried out.

The solution of the cerium salt used according to the process of the invention may comprise any aqueous solution of a cerium salt in the cerous and/or ceric state, soluble under the selected operating conditions of the invention, and, notably, a solution of cerous chloride, or cerium nitrate in the cerous or ceric state, or a mixture of both.

The cerium salt is selected such that it contains no impurities which may be transferred to the final composition, after calcination. It may be advantageous to employ a cerium salt having a degree of purity in excess of 99%.

The concentration of the cerium salt solution is not a critical factor according to this invention. It may thus vary over wide limits, advantageously from 0.2 to 4 moles per liter; a concentration ranging from 0.5 to 2 moles per liter is preferred.

In a preferred embodiment of the process according to the invention, the cerium is introduced into the reaction medium in the cerous state and it is oxidized to the ceric state by continuously adding to the reaction mixture an oxidizing agent compatible therewith. Exemplary of such oxidizing agents, the following are representative: solutions of sodium, potassium or ammonium perchlorate, chlorate, hypochlorite or persulfate, hydrogen peroxide, air, oxygen or ozone. The cerium may also be oxidized electrochemically.

Hydrogen peroxide is preferably employed.

The proportion of the oxidizing agent with respect to the cerous salt to be oxidized may also vary over wide limits. It is typically higher than the stoichiometric amount and preferably is from 10 to 40% in excess thereof.

The basic solution employed in the process of the invention is advantageously an aqueous solution of ammonia or sodium hydroxide, potassium hydroxide or sodium carbonate.

The ammonia solution is preferably employed.

The normality of the basic solution used too is not a critical factor according to the invention; it also may vary over wide limits, but advantageously it ranges from 1 to 5N.

The proportion of the basic solution and the cerium salt solution should be such that the number of equivalents of the basic solution introduced is greater than or equal to the number of equivalents of cerium introduced simultaneously. It may be advantageous to use a greater than 5% excess of equivalents of base with respect to the equivalents of cerium. The pH of the reaction medium may range from 5 to 10. It advantageously ranges from 7 to 9. It may be especially advantageous to control the pH at a constant value within ±0.1 pH unit.

The aqueous solution of the salt of at least one trivalent rare earth or yttrium must be soluble under the operating conditions of the process of the invention. Exemplary of suitable salts, representative are the chlorides or nitrates of lanthanum, cerium, praseodymium, neodymium, samarium, europium, gadolinium, terbium, dysprosium, holmium, erbium, thulium, ytterbium, lutecium, and of yttrium. Advantageously, a solution containing a cerium salt and salts of rare earths originating directly or indirectly from the treatment of rare earth minerals is used. Preferably, salts of lanthanum or neodymium are used.

The concentration of the solution of the salt or salts of rare earths employed according to the process of the invention is again not a critical factor and may vary over wide limits; however, preferably it ranges from 0.2 to 1 mole per liter.

The proportion of the solution of a cerium salt to the aqueous solution of a salt or salts of trivalent rare earths is such that the ratio of the cerium dioxide to the rare earth oxides ($CeO_2 + Ln_2O_3$) ranges from 60 to 85% by weight.

The solution of the at least one oxide derivative of silicon may be any aqueous solution of an oxide derivative of silicon capable of forming insoluble rare earth compounds. The derivative or derivatives of silicon must be soluble in water. According to the invention, the following compounds are advantageously used: silicon dioxide, silicic acid and silicates of alkali metals. More precisely, amorphous silica, metasilicic acid, metadisilicic acid, sodium orthosilicate, sodium silicate of the formula $Na_2O.xSiO_2$, wherein x varies from 3 to 5, sodium metasilicate, sodium metadisilicate, potassium metasilicate, potassium metadisilicate, potassium tetrasilicate, are used. These salts may be used either in anhydrous or hydrated form.

Preferably, sodium silicate, $Na_2O.4SiO_2$, is used.

The concentration of the solution of the oxide derivative or derivatives of silicon too is not a critical factor according to the invention and may also vary over wide limits; when expressed in moles/liter of $SiO_2$, it preferably ranges from 0.1 to 2.0.

The proportion of the solution of the oxide derivative or derivatives of silicon and the aqueous solution of the salt or salts of trivalent rare earths is established such that the ratio of equivalents of silicate ($SiO_3^=$) to the equivalents of trivalent rare earth ranges from 0.1 to 1, preferably from 0.2 to 0.6.

In the process of the invention the number of anionic equivalents is greater than or equal to the number of cationic equivalents employed; it should not, however, give rise to the formation of adsorption compounds on the composition obtained by the mixture of reagents.

The mixture of the different solutions of the aforesaid reagents may be effected by any one of numerous variants. For example, admixture may be carried out under agitation by continuously adding, and in a separate manner, the solution of the cerium salt, and then the solution of the oxidizing agent, the solution of the salt or salts of the rare earth or earths, the solution of the oxide derivative or derivatives of silicon, and the basic solution. A premixture of the cerium salt solution and the solution of the salt or salts of the rare earth or rare earths may also be prepared and continuously added to the reaction medium in parallel with the other two solutions. There may also be prepared a premixture of the solution of the oxide derivative or derivatives of silicon with the basic solution. In the case of use of an oxidizing agent, it is possible to employ it in admixture with a solution other than the basic solution, in particular in a mixture with the solution of the cerium salt and/or the solution of the salt or salts of the rare earths.

Regardless of the order of the introduction of the solutions of the reagents selected, the admixture takes place instantaneously: a well defined concentration of the different species is obtained at any given instant throughout the reaction mass. This makes it possible to obtain homogeneous and well defined compositions, having stable properties.

The temperature of the reaction medium should preferably range from 10° to 95° C., more preferably from 40° to 70° C.

The residence time of the mixture in the reaction medium is not a critical factor according to the invention and may also vary over wide limits; generally, residence times ranging from 30 min to 2 hours are selected.

According to another embodiment of the process according to the invention, the reaction mass may be aged for a certain period of time at a temperature ranging from 10° to 95° C., preferably from 50° to 80° C., prior to filtration. In this case, the aging time is not a critical factor according to the invention and may vary over wide limits; however, a period of time of from 30 min to 2 hours is typically satisfactory.

The second stage of the process according to the invention consists of filtering the reaction mass upon completion of the reaction; it is present in the form of a suspension. This filtering operation is effected optionally continuously at ambient temperature, i.e., at a temperature of from 10° to 25° C.; the reaction mass is at a temperature ranging from 10° to 90° C., preferably from 35° to 45° C.

According to another embodiment of the invention, the filter cake may subsequently be washed with water or a solution of an ammonium salt. After washing, the water content of the filter cake ranges from 20 to 80% by weight and generally from 30 to 50%.

The product obtained after filtration and optional washing is then dried, optionally continuously. The drying temperature preferably ranges from 100° to 600° C. The drying time is also not critical and may vary under these conditions from 30 min to 24 hours.

The dry product is then calcined, optionally continuously, at a temperature of at least 850° C., but preferably at a temperature of from 850° to 1050° C.

The upper limit of the temperature range is not critical and may attain a value as high as 1500° C.

In contrast, it has surprisingly been determined that the lower limit for the calcining temperature is critical and must be equal to at least 850° C. If a lower temperature is selected, a composition is obtained which does not include the crystallographic phase $Ln_{2-x}Ce_xSi_2O_7$, which is responsible for the desirable properties of the compositions of the invention. The duration of calcination ranges from 30 min to 10 hours.

The calcined product is subsequently ground in a manner such that the dimensions of the aggregates thereof range from 0.2 to 5.0 $\mu$m. The median diameter is defined as a diameter such that 50% by weight of the aggregates have a diameter larger or smaller than the median diameter.

Grinding may be accompanied by any grain size selection operation, which may be carried out simultaneously or successively.

The process of the invention may be carried out in conventional apparatus. The stage of mixing of the reagents is effected in a reactor equipped with a temperature controlled heating device, the usual reaction control means (thermometer), agitator means (anchor or screw agitator), means to introduce the reagents and a pH control unit placed at the outlet of the reactor.

The aging operation is carried out in the same type of apparatus, with the difference that it is not equipped with means for the introduction of the reagents and the pH control unit. The transfer of the reaction mass from one reactor to the other is by gravity.

The suspension obtained may be subsequently filtered in a continuous filtering apparatus, for example, a rotating Vernay type filter or a belt filter.

The filter cake is introduced by any appropriate mechanical means (scraper) into the drying/calcining apparatus.

The drying and calcining operations may be effected in two different installations, or they may follow each other in a single, rotating furnace type apparatus. Preferably, a slightly inclined rotating furnace is used, permitting the circulation of the material and carrying out, in a first section thereof, the drying of the product and in a second section its calcination by means of a higher temperature gradient due to the proximity of the flame, preferably fuelled with natural gas.

After calcination, the composition obtained may be subjected to a finishing operation, including grinding and grain size selection, which may be effected in the same apparatus, for example, a micronizer assembly.

According to the process of the invention, polishing compositions are obtained having the following overall chemical analysis (percentages are given by weight):

(a) rare earths expressed as the oxides thereof: 75 to 95%

(b) silicon expressed as the dioxide thereof: 5 to 25%.

The percentage of cerium dioxide therein with respect to the total weight of the rare earth oxides ranges from 60 to 85%.

The subject compositions have a specific surface ranging from 1 m$^2$/g to 35 m$^2$/g, the specific surface (BET) being determined by the Brunauer/Emmett/Teller method described in *The Journal of the American Chemical Society*, 60, p. 309 (February, 1938). Depending upon its application, a composition is selected preferably having a specific surface ranging from 3 to 10 m$^2$/g.

Scanning electron microscope examination shows that the calcined material comprises blocks of small dimensions, less than 100 $\mu$m, which are the result of the agglomeration of grains, which themselves comprise elementary particles having particle sizes on the order of 0.2 $\mu$m.

The three elements Si, Ln, Ce are homogeneously distributed throughout the grains.

The compositions of the invention essentially comprise two crystallographic phases: a $CeO_2$ type phase having a cubic structure and a rare earth pyrosilicate phase $Ln_{2-x}Ce_xSi_2O_7$ having an orthorhombic structure, wherein x is greater than or equal to 0 and less than 2, and preferably x is greater than or equal to 0 and less than or equal to 0.2.

The subject compositions further contain, in lesser amounts, a rare earth oxide phase, generally a sesquioxide $Ln_2O_3$ having a cubic structure of fluorine type and a $SiO_2$ silicon dioxide phase, in vitreous form, or crystallized in the form of cristobalite when the calcining temperature is higher than 950° C.

The proportions of the different phases vary as a function of the raw materials used and the conditions of calcination.

Typically, they are as follows:
(i) $CeO_2$: 30 to 80%
(ii) $Ln_{2-x}Ce_xSi_2O_7$: 12 to 60%
(iii) $Ln_2O_3$: 0 to 15%
(iv) $SiO_2$: 1.5 to 8%

The compositions obtained according to the process of the invention are useful in the polishing of glass and similar materials.

They are especially useful in the optical industry, in the field of production of eyeglasses, whether series or mass production, and also in the production of prescription spectacle lenses.

A particularly important field of application of said compositions is in the glass industry including the manufacture of crystal, mirrors, flat glass, in particular glazing and double glazing, automotive rear view mirrors and television screens.

The use of the compositions of the invention in the polishing of glass is carried out in conventional manner. As they are typically used in a spray polishing system, they are suspended in water.

The polishing bath is prepared simply by adding the powder composition to the aqueous medium, agitated manually or by conventional agitating means (anchor or screw agitators, turbine agitation, etc.).

The amount of composition introduced is such that typically the concentration of the composition expressed in $CeO_2$ varies from 30 to 200 g per liter of the bath, preferably approximately 50 g/liter.

The amount of water used for the formulation of the polishing bath is not critical, but it is preferable, in order to well maintain the compositions of the invention in suspension, to use soft water, i.e., water having a hardness of less than 30° TH.

The temperature of the bath should be less than 50° C. It is advantageous to operate at low temperatures on the order of 20° C., as any increase in temperature accelerates the settling of the suspension.

The polishing compositions according to the invention have numerous advantages:
(1) they have an improved appearance: fineness, grain size, color;
(2) they possess good homogeneity and reproducibility properties;
(3) they have good density and suspension maintenance characteristics;
(4) they result in an improved performance: polishing efficacy, polishing rate, low rejection rates of polished pieces, and the like.

Furthermore, they have the added advantage in comparison with the compositions described in the aforesaid '601 French patent of not entailing fluoride ions in the course of their manufacture.

Finally, their use is especially advantageous in that they may be recycled into the glass after use and when their polishing efficacy is reduced. In fact, they contain no ions capable of interfering with the composition of the glass and may thus advantageously serve as a source of ceric oxide.

In order to further illustrate the present invention and the advantages thereof, the following specific examples are given, it being understood that same are intended only as illustrative and in nowise limitative.

In Examples 1 to 3 are exemplified compositions wherein the ratio of cerium oxide to the oxides of the rare earths remained constant at 65% and the ratio of equivalents of $SiO_3^=$ to equivalents of $Ln^{3+}$ was 0.2, 0.4 and 0.6, respectively.

In Examples 4 and 5 compositions were prepared wherein the ratio of cerium dioxide to the oxides of the rare earths was 85% and the ratio of equivalents of $SiO_3^=$ to equivalents of $Ln^{3+}$ was 0.1 and 0.4, respectively.

The final products were characterized by the following physical and chemical test methods:
(1) Chemical analysis:
   (i) Determination of rare earth oxides: same was conducted following sintering of the compositions, by calcination in the presence of sodium peroxide, and precipitation by means of oxalic acid after acid treatment, by the Kholtoff method;
   (ii) Determination of $SiO_2$: same was conducted by X-ray fluorescence, after shaping the composition into beads via borax treatment;
(2) Specific surface:
Same was conducted by the aforesaid Brunauer/Emmett/Teller method;
(3) Apparent packed industry:
Same was conducted according to the standard DIN No. 53 194.

The principle of this standard consists of introducing a known quantity of the product in powder form into a graduated cylinder and to then pack it under predetermined conditions;
(4) Crystalline structure:
The Debye and Scherrer transmission method: monochromatic molybdenum radiation.

Examples 6 to 10 are examples of use of the compositions prepared in Examples 1 to 5 in the polishing of glass, with their suitability therefor being determined in a series of tests.

EXAMPLES 1 TO 3

Three compositions were prepared as follows:
(i) The following solutions were respectively introduced into three different premixing vessels:
(1) a 3N aqueous ammonia solution;
(2) an aqueous solution containing cerous nitrate in a concentration of 112 g/l, expressed as $CeO_2$ (1.9 equivalent/liter of $Ce^{3+}$) and lanthanum nitrate in a concentration of 60 g/l, expressed as $La_2O_3$ (1.1 equivalent/liter of $La^{3+}$), and
200 volumes of an aqueous solution of hydrogen peroxide, the proportion of hydrogen peroxide with respect to the cerous salt being a 35% excess;
(3) a solution of sodium silicate having the composition $Na_2O.4 SiO_2$, the concentration of which varied according to the particular example and is reported in Table I. An amount of ammonia necessary to convert the $SiO_2$ to $SiO_3^=$ was also introduced.

Into a temperature controlled 2-liter reactor, equipped with an agitator system and a pH control unit placed at its outlet, the following solutions were introduced:

[I] the solution (2) of the rare earth nitrates at a rate of 450 cm$^3$/hour,

[II] the ammonia solution (1) at a rate such that the pH of the reaction medium was controlled at pH 7.7, and

[III] the sodium silicate solution (3) at a rate of 500 cm$^3$/hour.

The reactor was operated at 45°–50° C.; the residence time of the reaction mixture therein was 1 hour.

The reaction mass was transferred by gravity into a like reactor wherein aging was carried out at a temperature of 70° C. over a residence time of 1 hour.

(ii) The reaction mass was next filtered at ambient temperature on a Büchner filter.

(iii) The precipitate obtained was subsequently dried in an oven at a temperature of 120° C. for 16 hours, followed by calcination in a muffle furnace for 2 hours at a temperature as also reported in Table I.

(iv) A final product was obtained in a yield higher than 95%. Coarse particles were eliminated by passage of the product through an AFNOR sieve with mesh openings of 40 μm.

The products thus obtained were then characterized. The results obtained are compiled in Table I.

TABLE I

| Example | Ratio $\frac{CeO_2}{CeO_2 + La_2O_3}$ | Ratio equivalents of $SiO_3^=$ equivalents of $Ln^{3+}$ | Temperature of calcination (°C.) | Chemical analysis Rare earth oxides | Total $SiO_2$ | Specific surface (m$^2$/g) | Apparent packed density |
|---|---|---|---|---|---|---|---|
| 1 | 65 | 0.2 | 1050 | 90.7 | 9.5 | 9 | 1.2 |
| 2 | 65 | 0.4 | 950 | 82.9 | 17.6 | 4.2 | 1.35 |
| 3 | 65 | 0.6 | 950 | 76.4 | 24.7 | 3.6 | 1.45 |

Scanning electron microscope examination evidenced that the compositions of Examples 1 to 3 were small blocks, less than 100 μm in size, resulting from the agglomeration of elementary particles of sizes on the order of 0.2 μm, some of which began to coalesce at about 950°–1000° C.

Examination by X-ray probe evidenced that the three elements Si, La, Ce were distributed in an essentially homogeneous manner; there were no particles of silica only, or particles devoid of silica.

The compositions prepared according to Examples 1 to 3 were analyzed by X-ray diffraction.

The phases observed were the following:

(a) Composition of Example 1: monoclinic $La_2O_3$ (weak) + $CeO_2$ (strong) + $Ln_2Si_2O_7$ (seak);

(b) Composition of Example 2: cristobalite $SiO_2$ (weak) + $CeO_2$ (strong) + $Ln_2Si_2O_7$ (medium);

(c) Composition of Example 3: cristobalite $SiO_2$ (medium) + $CeO_2$ (strong) + $Ln_2Si_2O_7$ (medium).

The parameters of the $Ln_2Si_2O_7$ phase were:

|  | a ± 0.01 Å | b ± 0.01 Å | c ± 0.01 Å |
|---|---|---|---|
| Example 1 | 8.80 | 13.20 | 5.40 |
| Example 2 | 8.80 | 13.21 | 5.39 |
| Example 3 | 8.80 | 13.21 | 5.40 |

The parameters of the $Ln_2Si_2O_7$ phase were identical within the accuracy of the measurements effected.

The intensity parameters of the $CeO_2$ type structure were as follows:

|  | a ± 0.01 Å | Rate of crystallization* |
|---|---|---|
| Example 1 | 5.44 |  |
| Example 2 | 5.42 | ≈55 |
| Example 3 | 5.42 | ≈53 |

*rate calculated after correction of absorption coefficients

The known parameters of the phases $La_2Si_2O_7$ and $Ce_2Si_2O_7$ are reported as:

|  | a ± 0.01 Å | b ± 0.01 Å | c ± 0.01 Å |
|---|---|---|---|
| $La_2Si_2O_7$ phase | 8.794 | 13.201 | 5.409 |
| $Ce_2Si_2O_7$ phase | 8.722 | 13.056 | 5.401 |

The lattice parameter for cerium dioxide alone is 5.411 Å (JCPDS 4.0593).

A high value of the parameter of the $CeO_2$ type structure corresponds to an insertion of lanthanum in the $CeO_2$ structure.

It was noted that the presence of silica facilitated the migration of lanthanum from the $CeO_2$ structure: in Example 1 where there was little silica, the $CeO_2$ parameter is raised to 5.44 Å (instead of 5.411 Å) in spite of the calcination of the compound at 1050° C.

At the rate at which the pyrosilicate phase appeared, the lattice parameter of the type $CeO_2$ approached that of cerium dioxide alone. Over the course of the calcination there was segregation on a microscopic scale (less than or equal to 1000 Å) between the lanthanum and the cerium.

In the compositions of Examples 2 and 3, cerium was present essentially in a form close to $La_2Si_2O_7$ and the excess silica was found in the form of cristobalite or vitreous silica.

In view of the parameters of the phases observed in the compositions of the invention and the parameters of the phases $La_2Si_2O_7$ and $Ce_2Si_2O_7$, it was determined that the pyrosilicate phase of lanthanum corresponded to the formula $La_{2-x}Ce_xSi_2O_7$, wherein x was less than 0.2.

EXAMPLES 4 AND 5

The procedure of Examples 1 to 3 was repeated, except that an aqueous solution was used containing cerous nitrate in a concentration of 146 g/l, expressed as $CeO_2$ (or 2.6 equivalents/liter of $Ce^{3+}$) and lanthanum nitrate in a concentration of 26 g/l, expressed as $La_2O_3$ (or 0.5 equivalent/liter of $La^{3+}$).

The concentration of the sodium silicate solution was such that in Examples 4 and 5 a ratio of equivalents of $SiO_3^=$ to equivalents of $Ln^{3+}$ was established at 0.1 and 0.4, respectively.

The characteristics of the final products are reported in Table II.

TABLE II

| | | | | Chemical analysis | | | |
|---|---|---|---|---|---|---|---|
| Example | Ratio $\dfrac{CeO_2}{CeO_2 + La_2O_3}$ | Ratio $\dfrac{\text{equivalents of } SiO_3^=}{\text{equivalents of } Ln^{3+}}$ | Temperature of calcination (°C.) | Rare earth oxides | Total $SiO_2$ | Specific surface $(m^2/g)$ | Apparent packed density |
| 4 | 85 | 0.1 | 1050 | 95.2 | 4.8 | 9 | 1.3 |
| 5 | 85 | 0.4 | 980 | 83.4 | 17.6 | 5.3 | 1.4 |

EXAMPLES 6 TO 10

These examples illustrate the use of the compositions of the invention described in Examples 1 to 5 in the polishing of glass.

In order to evaluate their behavior in the polishing of glass, the subject compositions were subjected to a series of the following tests:

(a) Behavior in suspension:

Into a 250 cm³ test tube, an aqueous suspension of the composition to be tested was introduced in a concentration of 50 g/l, or 12.5 g of powder in 250 cm³ of water having a hardness of 28°TH and a temperature of 20° C. After complete homogenization of the suspension, its rate of settling was determined by means of a densitometer (graduated from 1000 to 1100) as a function of time. A curve d=f(t) was plotted.

The $T_{50}$ is the designation for the behavior of the product in relation to its ability to remain in suspension. This is the elapsed time, expressed in decimal minutes, at the end of which the value measured is the median between the initial density and the final density of the clear liquid.

(b) Caking index

Even though their effects are similar, both in relation to their development and the disadvantages they cause, it is appropriate to dissociate compaction from caking. Compaction involves the fresh product. Caking, in contrast, appears in the processing apparatus during or after the product is worked.

In the case of polishing under severe conditions (high velocity, high pressures) the polishing composition suffers appreciable mechanical wear: fracture of the agglomerates, changing of the grain size distribution in the direction of fines. The suspension is on the other hand enriched in exogenic particles (silicates from the glass removed). The combination of these two factors leads to the condition that, when at the end of the day or the week the machines are stopped, as is often the case, the product settles in the tanks and pipes in the form of a consistent and adhesive sludge. This is the phenomenon of caking. Re-suspension upon again commencing operation is difficult and in the worst case, impossible.

The suspension, after having served as the polishing medium (see the following test), was collected in a stainless steel beaker to determine the caking index thereof. After being at rest for 24 hours, during which settling occurs, the product was re-suspended by controlled mechanical agitation (250 rpm, 5 min). The supernatant was discarded and the beaker placed in an oven to dry the fraction that had not been replaced in suspension. The caking index (IC) is the percentage representing this fraction, with respect to the amount of composition initially employed.

(c) Initial compaction:

This parameter derives chronologically from the maintenance of the composition in suspension. In effect, whether assisted or not, the product will always settle. Users often prepare their suspension in advance, at the concentration desired, and store it for later use in appropriate apparatus. A lapse of time, up to several days, occurs between the preparation of the suspension and its use, during which settling takes place. There are then two possible cases:

(i) either the sediment forms an expanded, impalpable layer;

(ii) or the portion resting on the bottom of the tank becomes sludge-like, adhesive, even resembles concrete.

The re-suspension of the product is instantaneous and complete in the first case and the original concentration is reestablished.

If, however, in contrast there is compaction of the product as in the second case, only a part of the product is placed in suspension, leading to a depletion of the polishing composition in the bath. In extreme cases, compaction is of a proportion such that it is impossible to detach the product from the bottom of the tank. This results in a significant loss in the new product, which has become unusable.

In order to appreciate the tendency of the composition to compact, the following test was performed. It consisted of preparing in suitable vessel 5 liters of a well homogenized suspension by the dispersion of 100 g of the composition to be tested per liter of tap water. After 24 hours, the condition of the settled portion was "evaluated manually". Two further determinations were made after 48 and 72 hours. In view of the impossibility to numerically express a tactile sensation, the extent of compacting was evaluated according to the following scale: no compacting, light compacting, compaction.

(d) Polishing efficacy:

The test was conducted with different types of polishers: polyurethane foam, felt and Pellon (skin).

Efficacy on polyurethane foam:

An industrial CMV machine, model ICM 7 was used; it was equipped with two brushes and a convex polishing head. A pump fed the suspension of the polishing composition to be tested to the glass surface to be polished.

Operating conditions were as follows:

| | | |
|---|---|---|
| (i) | Velocity of the head | 1500 rpm |
| (ii) | Velocity of the brushes | 1000 rpm |
| (iii) | Pressure | 1200 g/cm² |
| (iv) | Concentration of suspension | 50 g/l |
| (v) | Hardness of water | 28° TH |
| (vi) | Temperature | 20° |
| (vii) | Polisher | polyurethane foam MPU LP 46 (1.3 mm thick) |
| (viii) | Glass to be polished | Crown white |

| | |
|---|---|
| diameter | 55 mm |
| (ix) Pump flow rate | 3.8 to 4 l/min |
| (x) Experimental period | 3 min |
| (xi) Overall test period | 60 min |

The concave faces of the two specimens of glass were worked together for 3 min, after which material removal was determined by weighing. The experiment was repeated for one hour.

The weight removed is related to:

| | |
|---|---|
| (1) Unit weight | mg |
| (2) Unit surface | $dm^2$ |
| (3) Unit time | min |

The polishing efficacy curve is plotted as a function of working time.

From this curve, polishing efficacy is expressed as the mean of the first 10 results.

Efficacy on felt:

The experiments were conducted on a Coburn 603 machine with a single brush, the felt polishing cloth of which was sprayed uniformly with the composition to be tested.

Operating conditions were as follows:

| | |
|---|---|
| (i) Velocity of polisher | 550 rpm |
| (ii) Velocity of brush | identical, as the brush is borne by the polisher |
| (iii) Pressure | 250 g/cm² |
| (iv) Concentration of suspension | 50 g/l |
| (v) Water hardness | 28° TH |
| (vi) Temperature | 20° C. |
| (vii) Polisher | felt (Blu-Streak type) |
| (viii) Glass to be polished | Crown white |
| (ix) Turbine flow rate | 1.2 to 1.4 l/min |
| (x) Duration of experiment | 15 min |
| (xi) Overall test period | 1 hour, 30 min |

The expression of polishing efficacy was completely identical to that described for the CMV machine.

Polishing efficiency was determined at the efficacy level, i.e., the mean of 45 min to 1 hour, 30 min tests.

Efficacy on Pellon (skin):

The test was performed using the aforesaid Coburn machine. The polisher employed was a self-adhesive Pellon manufactured by the Hartfelt Co. and bonded to a flat tool.

Operating conditions were the following:

| | |
|---|---|
| (i) Velocity of polisher | 550 rpm |
| (ii) Velocity of brush | identical, as brush is borne by the polisher |
| (iii) Pressure | 250 g/cm² |
| (iv) Concentration of suspension | 50 g/l |
| (v) Water hardness | 28° TH |
| (vi) Temperature | 20° C. |
| (vii) Polisher | Pellon |
| (viii) Glass to be polished | Crown white |
| (ix) Turbine flow rate | 1.2 to 1.4 l/min |
| (x) Duration of experiment | 15 min |
| (xi) Overall test period | 3 hours |

Polishing efficacy was determined by taking the mean of the efficacies obtained at 30, 45 and 60 min.

The polishing compositions of the invention subjected to this test, described above, provided the results reported in Table III.

In order to compare the properties of the polishing compositions and to evaluate their performance, the profile of a conventional polishing composition marketed under the trademark Cerox 1650 and having the following composition, was determined:

| | |
|---|---|
| (1) Rare earth oxides | 94% |
| (2) Cerix oxide | 66% |
| (3) Lanthanum oxide | 19% |
| (4) Neodymium oxide | 9% |
| (5) Praseodymium | less than 0.0001% |
| (6) Fluoride expressed in $F^-$ | 4% |
| (7) Phosphate expressed in $P_2O_5$ | 4% |

(i) Apparent packed density:
$d_A = 1.6 + 0.2$
(ii) Suspension behavior:
$T_{50} = 3$ min
(iii) Initial compaction:
No compaction
(iv) Caking index
IC = 40%
(v) Polishing efficacy:

| | |
|---|---|
| Efficacy on polyurethane foam | 370 mg/dm²/min |
| Efficacy on felt | 38 mg/dm²/min |
| Efficacy on Pellon | 44 mg/dm²/min |

The compositions of the invention gave results as good or better than those of the prior art, while at the same time providing the great advantage of being devoid of fluoride ions in their chemical composition, which ions are the source of a wide variety of problems in the manufacturing sequence.

TABLE III

| | Ex. 6 | Ex. 7 | Ex. 8 | Ex. 9 | Ex. 10 |
|---|---|---|---|---|---|
| Suspension behavior, $T_{50}$ in min | 5 | 4.7 | 4.7 | 3 | 7.5 |
| Caking index, % | 9.0 | 3.0 | 2.0 | 1.0 | 3.0 |
| Compaction | none | none | none | slight | none |
| Polishing efficacy (in mg/dm²/min) | | | | | |
| Polyurethane foam | 260 | 360 | 350 | 360 | 370 |
| Felt | 39 | 40 | 40 | 47 | 41 |
| Pellon | 52 | 53 | 45 | 56 | 53 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A polishing composition of matter comprising (i) at least one crystalline phase of $CeO_2$ type, and (ii) a crystalline phase which comprises a rare earth pyrosilicate having the formula $Ln_{2-x}Ce_xSi_2O_7$, wherein Ln is at least one lanthanide or yttrium and x is a number ranging from zero to less than 2.

2. The composition of matter as defined by claim 1, wherein x is a number ranging from zero to 0.2.

3. The composition of matter as defined by claim 1, wherein Ln is lanthanum or neodymium.

4. The composition of matter as defined by claim 1, further comprising at least a second rare earth oxide crystalline phase.

5. The composition of matter as defined by claim 4, further comprising a silicon dioxide phase.

6. The composition of matter as defined by claim 5, which comprises a vitreous silicon dioxide phase.

7. The composition of matter as defined by claim 5, which comprises a silicon dioxide crytalline phase.

8. The composition of matter as defined by claim 3, comprising lanthanum, silicon and cerium homogeneously distributed therethrough.

9. The composition of matter as defined by claim 1, comprising from 75 to 95% by weight of rare earth oxides and from 5 to 25% by weight of silicon dioxide.

10. The composition of matter as defined by claim 9, cerium dioxide comprising from 60 to 85% by weight of the total weight of said rare earth oxides.

11. The composition of matter as defined by claim 1, said phase (i) comprising a cubic crystalline phase.

12. The composition of matter as defined by claim 11, said phase (ii) comprising an orthorhombic crystalline phase.

13. The composition of matter as defined by claim 4, said at least second rare earth oxide crystalline phase comprising $Ln_2O_3$.

14. The composition of matter as defined by claim 1, comprising from 30 to 80% by weight of $CeO_2$, from 12 to 60% by weight of $Ln_{2-x}Ce_xSi_2O_7$, from 0 to 15% by weight of $Ln_2O_3$ and from 1.5 to 8% by weight of $SiO_2$.

15. The composition of matter as defined by claim 1, having a BET specific surface ranging from 1 $m^2/g$ to 35 $m^2/g$.

16. The composition of matter as defined by claim 15, having a BET specific surface ranging from 3 $m^2/g$ to 10 $m^2/g$.

17. The composition of matter as defined by claim 1, comprising particulate aggregates having a median diameter ranging from 0.5 to 1.5 $\mu$m.

18. The composition of matter as defined by claim 1, comprising block particulates with dimensions of less than 100 $\mu$m.

19. The composition of matter as defined by claim 7, comprising a cristobalite phase.

20. A process for the preparation of the composition of matter as defined by claim 1, comprising (1) intimately admixing (a) a solution of a cerium salt, (b) a basic solution, (c) an aqueous solution of at least one trivalent rare earth or yttrium salt, and (d) a solution of at least one oxide of silicon adapted to form an insoluble rare earth compound; (2) separating from such reaction medium the precipitate which results; and thence (3) drying and calcining said separated precipitate at a temperature of at least 850° C.

21. The process as defined by claim 20, wherein said cerium salt solution (a) comprises an aqueous solution of cerous chloride, or cerous or ceric nitrate, or mixture thereof.

22. The process as defined by claim 21, the cerium salt comprising said solution (a) being more than 99% pure.

23. The process as defined by claim 20, the concentration of the cerium salt in said solution (a) ranging from 0.2 to 4 moles per liter.

24. The process as defined by claim 23, the concentration of the cerium salt in said solution (a) ranging from 0.5 to 2 moles per liter.

25. The process as defined by claim 20, the solution (a) initially comprising a cerous salt, and which further comprises in situ oxidizing same to the ceric state by continuously adding an oxidizing agent to the reaction medium.

26. The process as defined by claim 25, comprising adding said oxidizing agent together with a solution other than the solution (b).

27. The process as defined by claim 25, said oxidizing agent comprising sodium, potassium or ammonium perchlorate, chlorate, hypochlorite or persulfate; hydrogen peroxide; air; oxygen; ozone; or electrochemical oxidation.

28. The process as defined by claim 27, comprising a 10 to 40% stoichiometric excess of said oxidizing agent with respect to said cerous salt.

29. The process as defined by claim 20, wherein said basic solution (b) is individually added to the reaction medium, or is added in a mixture with said silicon oxide solution (d).

30. The process as defined by claim 20, said basic solution (b) comprising an aqueous solution of ammonia, sodium or potassium hydroxide, or sodium carbonate.

31. The process as defined by claim 30, the normality of said basic solution (b) ranging from 1 to 5N.

32. The process as defined by claim 30, the reaction medium comprising an at least about 5% excess of basic equivalents with respect to cerium equivalents.

33. The process as defined by claim 20, the pH of the reaction medium ranging from 5 to 10.

34. The process as defined by claim 33, the pH of the reaction medium ranging from 7 to 9.

35. The process as defined by claim 33, the pH of the reaction medium being controlled within ±0.1 of a pH unit.

36. The process as defined by claim 20, wherein an aqueous solution (c) of at least one trivalent rare earth or yttrium salt is individually added to the reaction medium, or is added in a mixture with said cerium salt solution (a).

37. The process as defined by claim 36, the aqueous solution (c) of at least one trivalent rare earth or yttrium salt comprising a chloride or nitrate of lanthanum, cerium, praseodymium, neodymium, samarium, europium, gadolinium, terbium, dysprosium, holmium, erbium, thulium, ytterbium, lutetium or yttrium.

38. The process as defined by claim 37, the aqueous solution (c) of at least one trivalent rare earth or yttrium salt comprising a salt of lanthanum or neodymium.

39. The process as defined by claim 37, the concentration in said aqueous solution (c) of the salt or salts of the trivalent rare earths or yttrium ranging from 0.2 to 1 mole per liter.

40. The process as defined by claim 20, the proportion of the solution (a) of the cerium salt to the solution (c) of the salt or salts of trivalent rare earths or yttrium being such that the ratio of cerium dioxide to the oxides of the rare earths or yttrium ranges from 60 to 85%.

41. The process as defined by claim 20, wherein the solution (d) of at least one oxide of silicon adapted to form an insoluble rare earth compound is individually added to the reaction medium, or is added in a mixture with said basic solution (b).

42. The process as defined by claim 41, said solution (d) comprising an aqueous solution of silicon dioxide, silicic acid, or a silicate of an alkali metal.

43. The process as defined by claim 42, said solution (d) comprising an aqueous solution of sodium silicate, $Na_2O.4\ SiO_2$.

44. The process as defined by claim 20, the concentration in said solution (d) of said at least one oxide of silicon ranging from 0.1 to 2.0 moles/liter of $SiO_2$.

45. The process as defined by claim 20, the proportion of the solution (d) of the at least one oxide of silicon to the solution (c) of the at least one trivalent rare earth or yttrium salt being such that the ratio of the equivalents of silicate ($SiO_3^=$) to the equivalents of the at least one trivalent rare earth or yttrium ranges from 0.1 to 1.0.

46. The process as defined by claim 45, said ratio of the equivalents of silicate ($SiO_3^=$) to the equivalents of the at least one trivalent rare earth or yttrium ranging from 0.2 to 0.6.

47. The process as defined by claim 20, wherein the temperature of the reaction medium ranges from 10 to 95° C.

48. The process as defined by claim 47, wherein the temperature of the reaction medium ranges from 40 to 70° C.

49. The process as defined by claim 20, wherein the reaction time ranges from 30 min to 2 hours.

50. The process as defined by claim 20, comprising aging the reaction medium prior to the separation of the precipitate therefrom, at a temperature of from 10 to 95° C. for a period of time of from 30 min to 2 hours.

51. The process as defined by claim 50, wherein the temperature of aging ranges from 50 to 80° C.

52. The process as defined by claim 20, wherein the separation (2) of the precipitate is by filtration.

53. The process as defined by claim 52, further comprising washing the filter cake with water.

54. The process as defined by claim 52, wherein the drying of the precipitate is carried out at a temperature of from about 100 to 600° C. for a period of time of from about 30 min to 24 hours.

55. The process as defined by claim 54, wherein the dried precipitate is calcined at a temperature of from 850 to about 1500° C. for a period of time of from about 30 min to 10 hours.

56. The process as defined by claim 55, the temperature of calcination ranging from 850 to 1050° C.

57. The process as defined by claim 20, further comprising grinding and classifying the calcined precipitate.

58. A glass polishing bath, comprising a dispersion in water of the composition of matter as defined by claim 1, the concentration of $CeO_2$ therein ranging from 30 to 200 g per liter.

59. In a process for the polishing of a glass surface utilizing a glass polishing bath, the improvement which comprises, using as the glass polishing bath therefor, the bath as defined by claim 58.

* * * * *